United States Patent [19]

Kimura et al.

[11] 4,085,890

[45] Apr. 25, 1978

[54] POSITION DETECTING SYSTEM

[75] Inventors: Toshihiro Kimura, Nagoya; Yoshimaro Hanaki, Kasugai; Humio Nomura, Komaki, all of Japan

[73] Assignee: Okuma Machinery Works Ltd., Nagoya, Japan

[21] Appl. No.: 705,567

[22] Filed: Jul. 15, 1976

[30] Foreign Application Priority Data

Feb. 20, 1976 Japan .................................. 51-18380

[51] Int. Cl.² ........................ G06F 7/02; G05B 19/24; G06F 15/46; G06F 7/38
[52] U.S. Cl. .............................. 235/419; 235/92 MP; 318/571; 364/561
[58] Field of Search .................. 318/571; 235/61.6 H, 235/151.11, 92 MP, 61.7 R, 61.11 R

[56] References Cited

U.S. PATENT DOCUMENTS

| 3,794,814 | 2/1974 | Lay | 235/92 MP |
| 3,798,524 | 3/1974 | Okamoto | 318/571 |
| 3,852,719 | 12/1974 | Nishumura | 235/92 MP |
| 3,911,347 | 10/1975 | Hartung | 235/151.11 |
| 3,979,653 | 9/1976 | Cutler | 318/571 |

Primary Examiner—Robert M. Kilgore
Attorney, Agent, or Firm—Charles A. Blank

[57] ABSTRACT

A reference point detection pulse generator determines normally-equidistant reference points which provide references over the whole control axis range of a numerically controlled machine. On the basis of the outputs of the reference point detection pulse generator and a moving amount detection pulse generator, the position of a moving part is numerically calculated by a moving part position calculator means. The position of the moving part based on the output of the moving amount detection pulse generator is compared with that based on the output of the moving part position calculator means, and if an error is present therebetween an alarm is issued.

3 Claims, 5 Drawing Figures

POSITION DETECTING SYSTEM

BACKGROUND OF THE INVENTION

1. Field of the Invention

This invention relates to an improvement in a position detecting system for a machine, which detects the position of a moving part of the machine incrementally.

2. Description of the Prior Art

In the conventional position detecting systems of pulse count closed type or like for a machine, including a moving amount detection pulse generator for detecting the position of a moving part, the failure of the moving part of the machine to follow command pulses is sometimes caused by a mechanical or electrical trouble. In such a case, errors of the position of the moving part such as a table are undesirably accumulated. The detection of these errors during the operation of the machine involved requires a special device and is usually difficult. It is therefore common practice to determine an error by an accuracy inspection conducted on a finished work piece.

SUMMARY OF THE INVENTION

Accordingly, it is an object of the present invention to provide means for preventing an accumlation of errors due to erroneous electrical operations in a position detecting system not provided with any absolute position detector for detecting the position of a moving part of a numerically controlled machine.

Another object of the invention is to provide a position detecting system comprising a reference point detection pulse generator for determining normally-equidistant reference points providing references over the whole control axis range of a machine tool, and a moving part position calculator means for numerically calculating the position of a moving part on the basis of the outputs of the reference point detection pulse generator and a moving amount detection pulse generator, wherein when the comparison between the position of the moving part based on the output of the moving amount detection pulse generator and that based on the output of the moving part position calculator means results in an error, an alarm is issued.

DESCRIPTION OF THE PREFERRED EMBODIMENTS

Figure 1:
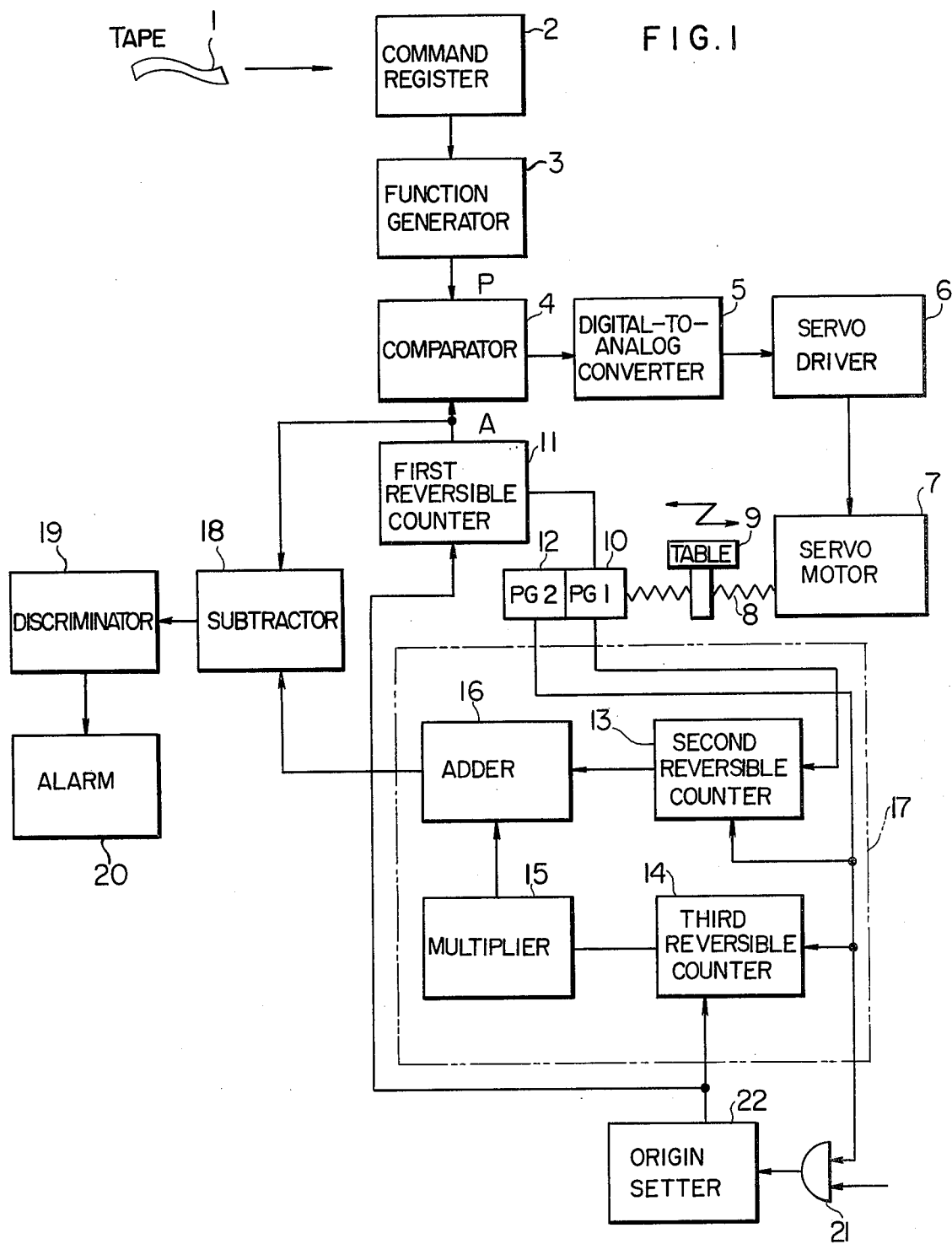
FIG. 1 is a block diagram showing an embodiment of the present invention as applied to the pulse count closed loop system.

The present invention will be described with reference to the accompanying drawings. A block diagram of an embodiment of the invention applied to the pulse count closed loop system is shown in FIG. 1. In this drawing, reference numeral 1 shows an input tape, numeral 2 a command value register for setting a command position of the table 9 which constitutes the moving part, and numeral 3 a function generator for generating a function P on the basis of the command position set by the command register 2. Numeral 4 shows a comparator, which keeps the output P of the function generator 3 compared with the value A (described later) representing the present position of the table 9. The difference, if any, between the output P and the value A is applied to a digital-to-analog converter 5 for conversion into an analog voltage, which is applied to a servo driver 6 thereby to drive a servo motor 7. As a result, the table 9 is moved by way of a feed screw 8. A moving amount detection pulse generator 10 (hereinafter referred to as PG1) is directly coupled to the feed screw 8 for generating pulses in the number proportional to the amount of movement of the table 9. These pulses are accumulated in the first reversible counter 11 to produce the numerical value A representing the present position of the table 9.

Figure 2:
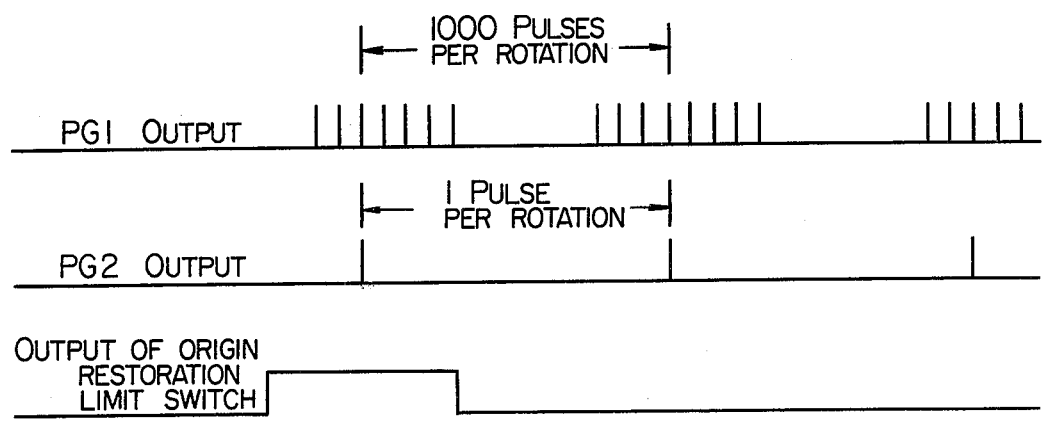
FIG. 2 is a diagram showing the relation among the outputs of a moving amount detection pulse generator PG1, a reference point detection pulse generator PG2 and an origin restoration limit switch.

A conventional control system of pulse count closed loop type was explained above. In order to obviate the disadvantages of the conventional system, the system according to the present invention is provided with a reference point detection pulse generator 12 (hereinafter referred to as PG2) for determining reference points over the whole control range of the movement of the table 9. In the embodiment under consideration, PG2 is coupled coaxially to the PG1 in such a manner as to produce one pulse for each rotation of the PG1, the outputs of the PG1 and PG2 having the relation as shown in FIG. 2. If each pulse of the output of the PG1 represents the table movement of 0.01 mm and the PG1 produces 1000 pulses for every rotation thereof, then the table 9 is fed by 10 mm for each rotation of the PG1. At the same time, a reference point pulse is produced by the PG2 for table feed of every 10 mm. By the way, the output of an origin restoration limit switch (described later) is necessary for the operation of origin restoration and is phase-related to the outputs of the PG1 and PG2 as shown in FIG. 2.

Turning back to FIG. 1, numeral 13 shows a second reversible counter for counting the output pulses of the PG1, which is cleared by the output of the PG2. Numeral 14 shows a third reversible counter for counting the output pulses of the PG2. Numeral 15 shows a multiplier for multiplying the output of the third reversible counter 14 by an integral number (1000 for the embodiment under consideration). Numeral 16 shows an adder for producing the sum of the output of the second reversible counter 13 and that of the multiplier 15. The second reversible counter 13, the third reversible counter 14, the multiplier 15 and the adder 16 make up a circuit 17 for calculating the position of the moving part. The output of the moving part position calculator circuit 17 is applied to a subtractor 18. The numerical value A representing the present position is also applied to the subtractor 18. These values supplied from the first reversible counter 11 and the moving part position calculator circuit 17 are subjected to comparison with each other and subtraction of one from the other in the subtractor 18. When these two values coincide with each other, the output of the subtractor 18 is zero so that no output is produced from the discriminator 19. If they fail to coincide with each other, by contrast, the output of the subtractor 18 is not zero, with the result that the discriminator 19 produces an output thereby to actuate the alarm 20. Numeral 21 shows an AND gate to which the output of the origin restoration limit switch and the output of the PG2 are applied. Numeral 22 shows an origin setter for setting an origin in the first reversible counter 11 and the third reversible counter 14 in response to the output of the AND gate 21. The origin setter 22 is used for restoring the origins after a power cut-off. In other words, as shown in FIG. 2, when the table reaches such a position as to enable the origin restoration limit switch to produce an output and the output from the PG2 arrives, an origin, say, the numerical value of zero is set in the first reversible counter 11 and the third reversible counter 14.

Explanation will be made now with emphasis on the operation of the PG1, the PG2, the first reversible counter 11 and the moving part position claculator circuit 17 in FIG. 1, with reference to (1) a normal case, (2) when the output of the PG1 is excessive, (3) the output of the PG1 is lacking, and (4) an abnormal case.

Figure 3:
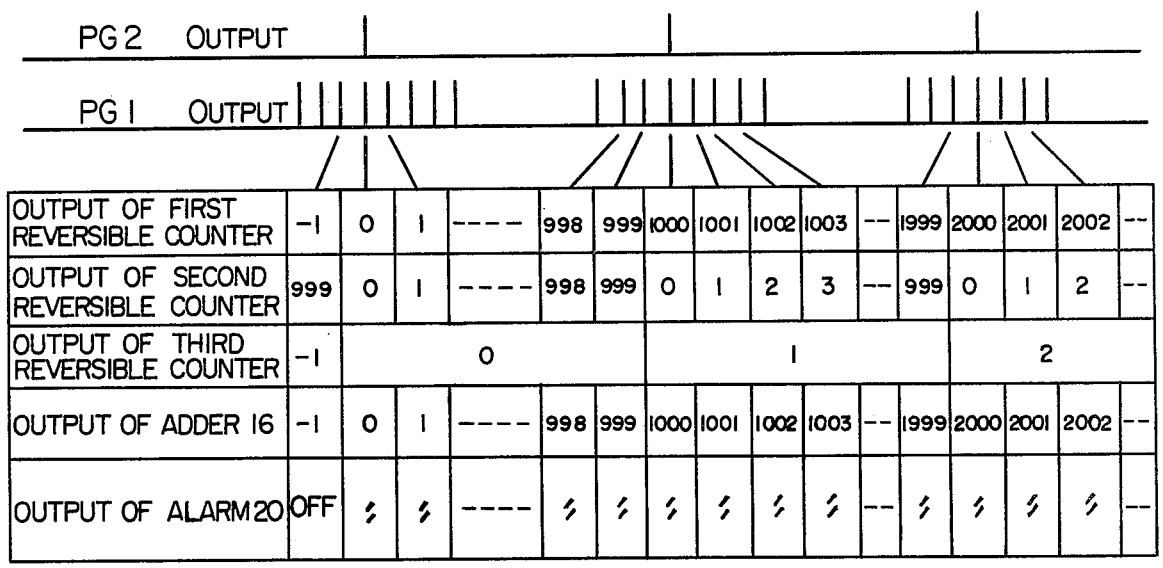
FIG. 3 shows the relation between the outputs of a first reversible counter 11 and a moving part position calculator circuit 17 under normal conditions.

(1) Normal Cases:

The relation among the outputs of the PG1, the PG2, the first reversible counter 11, and the outputs of the second reversible counter 13, the third reversible counter 14, and the adder 16 in the moving part position calculator circuit 17 is shown in FIG. 3. This relation is concerned with the case in which both the outputs of the PG1 and PG2 are normal and the operation of the reversible counters themselves is not erroneous. As will be obvious from the drawing, the first reversible counter 11 counts output pulses of the PG1 irrespective of the output of the PG2. The second reversible counter 13 counts the output pulses of the PG1 one by one but is reset thereby to resume the counting operation from zero each time of production of a pulse from the PG2. The third reversible counter 14 counts output pulses of the PG2, while the multiplier 15 multiplies the output of the third reversible counter 14 by 1000. The adder 16 is for adding the output value of the multiplier 15 to that of the second reversible counter 13. The output of the first reversible counter 11 and that of the adder 16 are subjected to comparison with each other and subtraction of one from the other in the subtractor 18. As will be seen from the drawing, the outputs of the first reversible counter 11 and the adder 16 are coincident with each other at every position associated with the output of the PG1, and therefore the output of the subtractor 18 is zero. Thus the discriminator 19 determines the condition to be "normal", so that no alarm signal is produced from the alarm 20.

Figure 4:
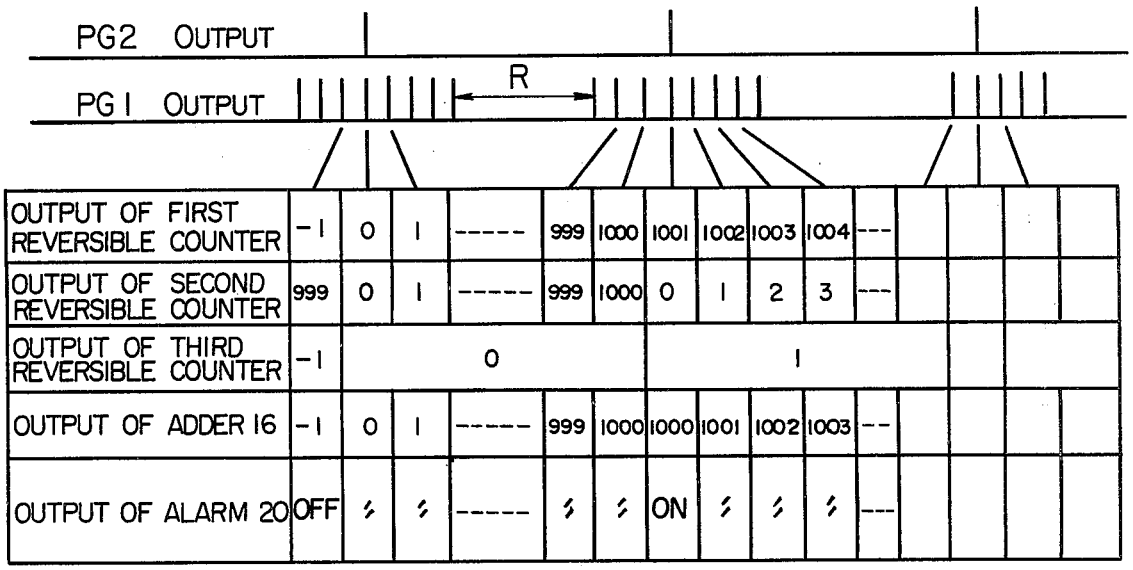
FIG. 4 is a diagram showing the relation between the outputs of the first reversible counter 11 and the moving part position calculator circuit 17 when the output of the moving amount detection pulse generator PG1 is excessive.

(2) When the Output of the PG1 is Excessive:

The relation among the outputs of the PG1, the PG2, the first reversible counter 11, and the outputs of the second reversible counter 13, the third reversible counter 14 and the adder 16 within the moving part position calculator circuit 17 is shown in FIG. 4. The diagram of FIG. 4 shows a case in which only the output of the PG1 is excessive, or specifically a case in which the output of the PG1 is excessive by one pulse for the section R shown by the arrow. As will be apparent from the diagram, the first reversible counter 11 continues to count the output pulses of the PG1 irrespective of the output of the PG2, and counts one pulse excessively for the section R shown by the arrow. This is also the case with the second reversible counter 13. And the counters are reset upon application thereto to the next output pulse of the PG2 thereby to resume the counting operation from zero. The third reversible counter 14, on the other hand, counts normal output pulses the PG2. The adder 16 performs the same operation as described in (1) above. The outputs of the first reversible counter 11 and the adder 16 are subjected to comparison with each other and subtraction of one from the other in the subtractor 18. At the time of arrival of the output of the PG2 after the section R of the output of the PG1, however, the outputs of the first reversible counter 11 and the adder 16 fail to coincide with each other as shown in the diagram under consideration, and therefore the output of the subtractor 18 is not zero. As a result, the discriminator 19 determines the case as abnormal thereby to issue an alarm from the alarm 20.

Figure 5:
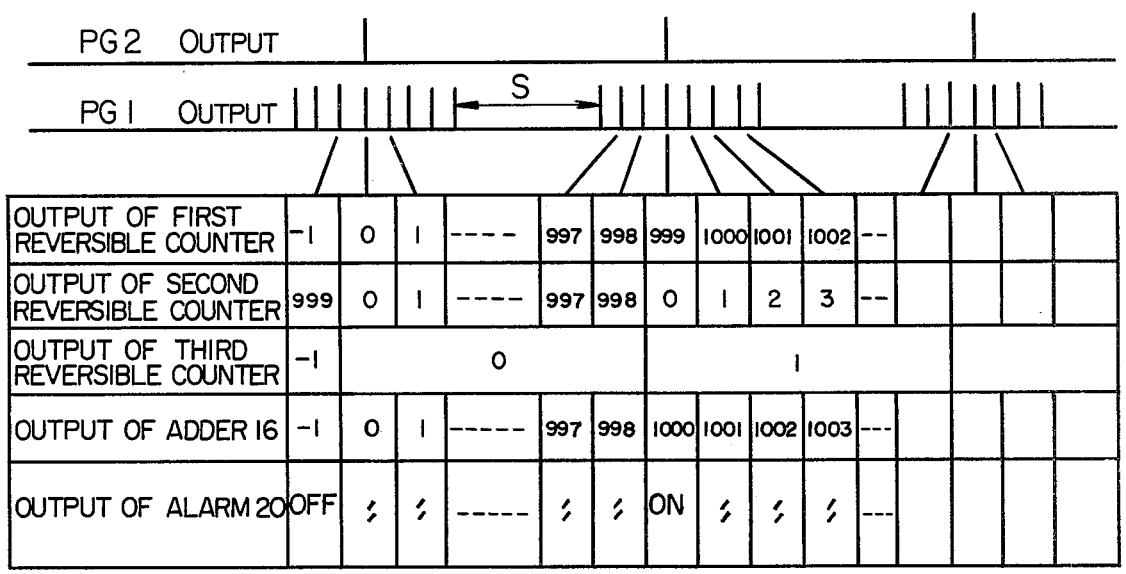
FIG. 5 is a diagram showing the relation between the outputs of the first reversible counter 11 and the moving part position calculator circuit 17 when the output of the moving amount detection pulse generator PG1 is lacking.

(3) When the Output of the PG1 is Lacking:

The relation among the outputs of the PG1, the PG2, the first reversible counter 11, and the outputs of the second reversible counter 13, the third reversible counter 14 and the adder 16 within the moving part position calculator circuit 17 is shown in FIG. 5. This diagram is representative of the case in which the output of the PG1 is lacking, or specifically the state in which the output of the PG1 is lacking by one pulse for the section S. The output values of the respective reversible counters and the adder 16 are as shown. The outputs of the first reversible counter 11 and the adder 16 are compared with each other and subtracted one from the other in the subtractor 18. It will be noted from the drawing that upon the arrival of the output of the PG2 after the section S of the output of the PG1 shown by the arrow, the outputs of the first reversible counter 11 and the adder 16 fail to coincide with each other so that the output of the subtractor 18 is not zero, thus causing the discriminator 19 to determine the case as abnormal. The result is the issuance of an alarm from the alarm 20.

(4) Abnormal Cases:

Other possible abnormal cases include (a) excessive output of the PG2, (b) the shortage of the output of the PG2, (c) improper operation of the first reversible counter 11 itself, (d) improper operation of the second reversible counter 13 itself, and (e) improper operation of the third reversible counter 14. The improper or erroneous operations involved in (a) to (e) above may be easily detected as in the cases (2) and (3) and therefore will not be explained by reference to drawings.

Although the multiplier in the embodiments of the invention is set at 1000 magnifications, it may be set at other than 1000 magnifications depending on the ratio of the outputs of the PG1 and the PG2. Further, the adder 16 may of course be eliminated from the moving part position calculator circuit 17 so as to subject the outputs of the second reversible counter 13 and the multiplier 15 to a subtracting operation directly at the subtractor 18.

It will be understood from the foregoing description that, according to the present invention, the error accumulation due to erroneous electrical operations, which is considered as a disadvantage of the conventional position detecting system without any absolute position detector, is easily prevented with a simple construction. Also, with regard to an erroneous output of the PG1 in the cases (2) and (3) above, the discriminator 19 may be so constructed as to cause an alarm to be issued from the alarm 20 while at the same time correcting the information stored in the first reversible counter 11, which indicates an erroneous position of the moving part at that time point, on the basis of the output of the moving part position calculator circuit 17, namely, the output of the adder 16. Still another advantage of the present invention is the fact the dependency of the operation of the origin setter 22 on the AND logics of the outputs of the origin restoration limit switch and the PG2 facilitates the origin restoration after a power cut-off.

We claim:

1. In a position-detecting system for a machine, including a moving amount detection pulse generator for incrementally detecting the position of a moving part of the machine; the improvement comprising a reference point detection pulse generator for determining reference points providing predetermined reference distances within the control range of the moving part, means for numerically calculating the position of said moving part on the basis of the output of said reference point detection pulse generator and said moving amount detection pulse generator, means for comparing the position of said moving part based on the output of said moving amount detection pulse generator with the position of said moving part based on the output of said moving part position calculator means, and means for issuing an alarm when the positions based on the outputs of said moving amount detection pulse generator and said moving part position calculator means fail to coincide with each other.

2. A position detecting system according to claim 1, in which said moving part position calculator means includes a second reversible counter for counting output pulses of said moving amount detection pulse generator, said second reversible counter being reset by the output of said reference point detection pulse generator, a third reversible counter for counting output pulses of said reference point detection pulse generator, a multiplier for multiplying the output of said third reversible counter by an integral number, and an adder for adding the output of said second reversible counter to the output of said multiplier.

3. A position detecting system according to claim 2, in which output pulses of said moving amount detection pulse generator are accumulated by said first reversible counter thereby to determine the position of said moving part; and said alarm is actuated while at the same time correcting the information in the first reversible counter on the basis of the output of said adder, when the output of said first reversible counter fails to coincide with the output of said moving part position calculator means, namely, the output of said adder.

* * * * *